United States Patent [19]

Smith et al.

[11] 4,007,117

[45] Feb. 8, 1977

[54] METHODS OF RECOVERING WOOL GREASE FROM SPENT WOOL SCOURING LIQUOR

[75] Inventors: Donald Kenneth Smith, London, England; Corran Norman Stuart McLachlan, Eastbourne, New Zealand

[73] Assignee: New Zealand Inventions Development Authority, Wellington, New Zealand

[22] Filed: Nov. 20, 1974

[21] Appl. No.: 525,631

[30] Foreign Application Priority Data

Nov. 21, 1973 New Zealand .................. 172664

[52] U.S. Cl. ........................... 210/44; 210/45; 210/53; 210/56
[51] Int. Cl.² .................................. C11B 11/00
[58] Field of Search ............... 210/44, 52, 54, 152, 210/42, 56, 73 R; 203/10; 8/139, 139.1, 141

[56] References Cited

UNITED STATES PATENTS

| 3,147,218 | 9/1964 | Booth et al. ........................ 210/54 |
|---|---|---|
| 3,436,342 | 4/1969 | Fujiwara et al. ..................... 210/66 |
| 3,677,940 | 7/1972 | Fujimoto et al. .................... 210/44 |
| 3,761,406 | 9/1973 | Tsuk ..................................... 210/52 |
| 3,871,820 | 3/1975 | Stewart et al. ................... 210/73 R |

FOREIGN PATENTS OR APPLICATIONS 1,112,596  5/1968  United Kingdom

*Primary Examiner*—Charles N. Hart
*Assistant Examiner*—Benoit Castel
*Attorney, Agent, or Firm*—Holman & Stern

[57] ABSTRACT

Method of treating wool scouring liquor effluent to render it suitable for recycling or discharge and to concurrently recover wool grease as a by-product. The method comprises mixing scouring liquor effluent with sufficient alcohol to produce a concentration in excess of saturation to leave a discrete alcohol phase, adding a selected flocculant to effect a liquid/liquid separation of grease from the liquor and stripping the separated grease from the alcohol phase.

10 Claims, 1 Drawing Figure

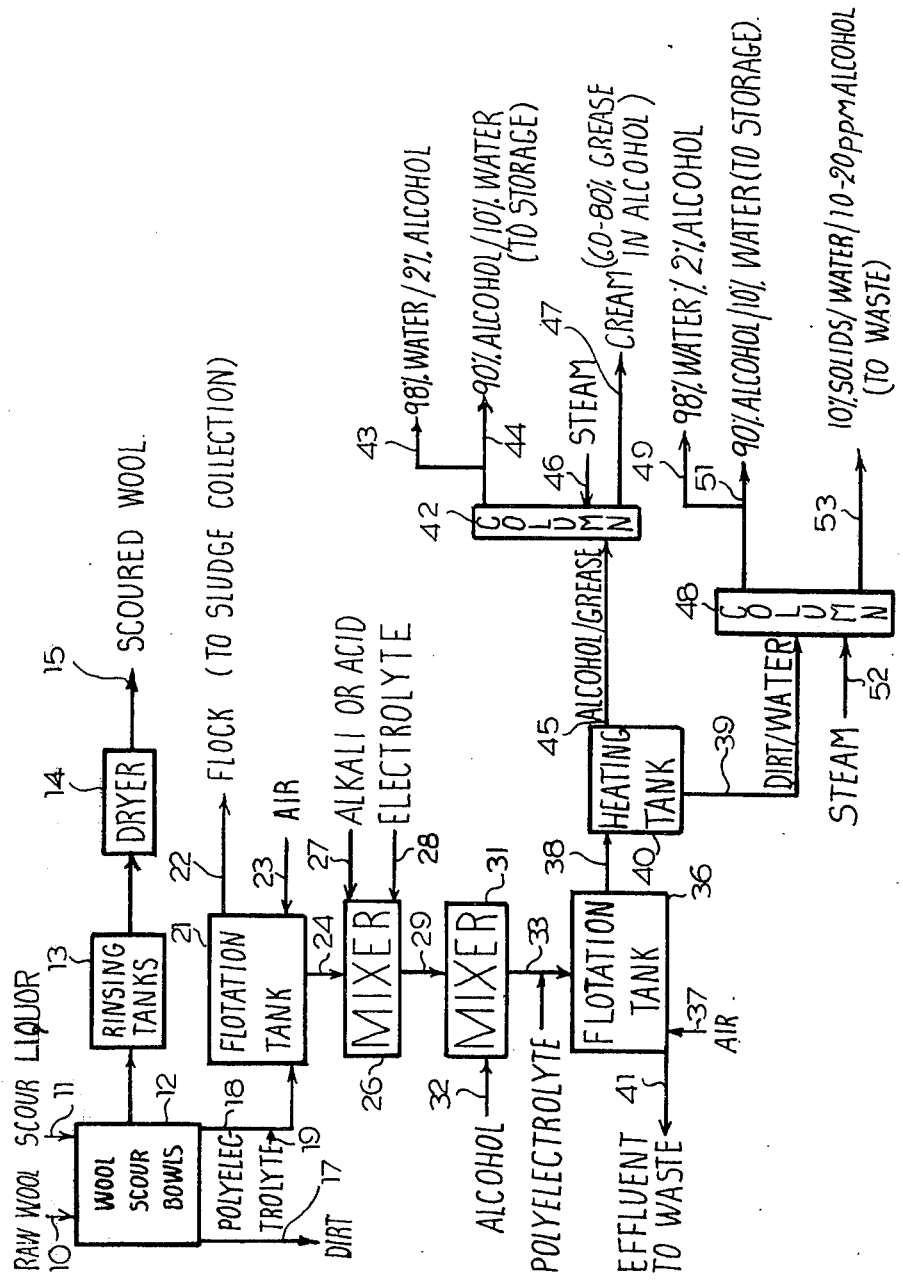

METHODS OF RECOVERING WOOL GREASE FROM SPENT WOOL SCOURING LIQUOR

BACKGROUND OF THE INVENTION

1. Field of the Invention

This invention relates to a method of treating wool scouring liquor effluent to render it suitable for recycling or discharge and to concurrently recover wool grease as a by-product.

2. Description of the Prior Art

The scouring of raw wool produces a liquor which contains varying amounts of woolgrease, suint, dirt, vegetable and faecal matter, fine wool fibre and detergent. The liquor is highly polluting because of the high level of solids, the large oxygen demand of the suint and the presence of the grease which has a high BOD and is not readily biodegradable.

The grease (technically a wax) consists of fatty acids and complex monohydric alcohols. The alcohols are sterols, triterpene alcohols and wax alcohols. The major constituent is cholesterol which accounts for 30–40% of the unsaponifiable material in the woolgrease. The fatty acids are derived from four main series — the normal fatty acids, the iso-acids, the branched-chain acids and hydroxy acids.

Suint is the water soluble material on the wool and consists largely of salts sweated by the sheep. Soluble salts of carboxylic acids make up 65% of the constituents of suint which also contains minor amounts of lactic, hippuric and succinic acids, urea and lanaurin, a bile pigment which gives suint its characteristic brown-red colour.

The removal of grease from scour liquor is advantageous because the grease is of commercial value, its removal increases the useful life of the scour liquor and grease removal reduces the pollution load of effluent discharged from a scour plant and renders it more amenable to further treatment. Many different techniques have been developed for the removal of grease from scour liquor, and of these the most common is the use of continuous sludge discharge centrifuges. After being fed through a settling tank or hydrocyclone to remove heavy solids the scour liquor is passed through a centrifuge which removes as a cream the grease mixed with water. The cream after heating and storage can be separated with a simple disc separator.

The oldest method of removal and one still in use is acid cracking. Sulphuric acid is added to the scour liquor to adjust the pH to 3.5 at which it cracks and the grease-rich phase is removed by filtration or flotation and the residual liquor is neutralised and discharged. A low quality grease may be extracted from the sludge removed from the liquor, however, as the cracking is only suitable for non-detergent scouring systems.

Also widely practiced is the use of salts such as ferrous sulphate, alum and calcium chloride to crack the grease/water emulsion. It is difficult to recover the grease from the sludge formed by these methods.

In British Patent 1,112,596 of Mosilana, Vlnarske Zavody, Narodni Padnik, a Czechoslavakian body corporate, which was published on May 8, 1968, there is disclosed and claimed a method for recovery of wool grease from spent wool scour liquor. The method comprises mixing spent scouring liquor while maintaining the original pH value with 1 to 10% by volume of an aliphatic or cyclic alcohol with 6 to 8 carbon atoms in the molecule, mechanically separating the aqueous phase which has been substantially freed from wool grease and recovering the wool grease from the alcoholic phase in the two phases. The phases are normally separated by a centrifuge. Alcohols with up to five or nine or more carbon atoms may not be employed in the process because the wool grease would remain in emulsion and could not be separated.

SUMMARY OF INVENTION

It is an object of this invention to overcome some of the disadvantages stated herein above or at least provide the public with a useful choice.

Accordingly, the invention may be said to consist in a method of treating spent wool scour liquor containing wool grease and concurrently recovering wool grease therefrom which comprises mixing a quantity of spent wool scour liquor with a predetermined quantity of an aliphatic or cyclic alcohol having between four and eight carbon atoms, said predetermined quantity being sufficient to saturate said liquor and to leave a separate alcoholic phase, mixing a flocculating amount of a cationic or nonionic organic polyelectrolyte flocculant into said liquor, mixing said alcoholic phase with said liquor to thereby transfer said wool grease from said liquor into said alcoholic phase, and, separating said wool grease from said alcoholic phase.

It is preferable for the liquor to have been pretreated to remove a significant amount of dirt prior to being introduced to the wool grease recovery operation. Although the effect of this operation is not dependent on the pre-treatment, the pre-treatment will ensure a higher standard of wool grease is obtained.

The pre-treatment may broadly be said to consist in a method of treating spent wool scoured liquor comprising the steps of including in the spent liquor a suitable water soluble polyelectrolyte and passing said liquor through a flotation chamber or other suitable separating vessel to cause at least a significant percentage of dirt to be removed therefrom.

This pre-treatment is more particularly described in our Application Ser. No. 504,820 filed Sept. 10, 1974, a continuation of our Application Ser. No. 422,141 filed Dec. 6, 1973, both of which are hereby incorporated by reference (both now abandoned).

Cationic or non-ionic organic polyelectrolyte flocculants found to be useful in the practice of the method of this invention are set out herein below in Table I.

TABLE I

| Manufacturer | Trade Marks | Type | Characteristic |
|---|---|---|---|
| Allied Colloids Manufacturing Co. Ltd | Magnafloc | 351 | N |
| | | 140 | C |
| | | 292 | C |
| | | 352 | C |
| | | 455 | C |
| | | LT24 | C |
| Cynamid International | Superfloc | N100 | N |
| | | N100S | N |

TABLE 1-continued

| Manufacturer | Trade Marks | Type | Characteristic |
|---|---|---|---|
| Chemische Fabrik Stockhausen & Cie | Praestol | 3000/73 | N |
| | | 2830/73 | N |
| | | 2850 | N |
| | | 011K | C |
| Nitto Chemical Inc. Co. | Diafloc | NP800 | N |
| W. R. Grace & Co. | Floerger | FO107 | C |
| | | FO115 | C |

"Magnafloc 351" is described by its manufacturer as a non-ionic polyacrylamide which is a white, free flowing powder which produces a high viscosity solution.

"Magnafloc 140", "Magnafloc 292", "Magnafloc 352" and "Magnafloc 455" are all described as cationic polyacrylamide based polymers which are white, free flowing powders and which produce high viscosity aqueous solutions.

"Magnafloc LT24" is described as a cationic polyacrylamide based flocculant which is a white, low-dusting powder containing less than 0.05% free acrylamide and having a molecular weight greater than 6 million.

"Superfloc N100" and "Superfloc N100S" are described as free flowing granules capable of forming a non-ionic aqueous solutions. The structures are homopolymers of acrylamide.

"Praestol 3000/73" is described by its manufacture as a non-ionic polyacrylamide with a polymerization degree of 200,000.

"Praestol 2830/73" is described as a copolymer of acrylamide and sodium acrylate wherein the amount of sodium acrylate is about 10% by weight and the degree of polymerization is about 200,000.

"Praestol 2850" is a copolymer of acrylamide and a specific acrylate. The relationship between both the components is about 1:1. The polymerization degree is less than 200,000.

"Praestol 011K" is a copolymer of acrylamide with a polyamino carbon acid ester which gives a cationic reaction in aqueous solution. About 20% of the product components contain cationic groups.

"Diafloc NP-800" is non-ionic polyacrylamide with a specific gravity between 0.6 and 0.7. It is a granular white powder and has a molecular weight of 10,000,000. At a concentration of 0.1 it exhibits a viscosity of 50cps.

"Floerger FO107" and "Floerger FO115" are both high molecular weight polymers of acrylamide which give cationic reactions in aqueous solution.

While these specific cationic and non-ionic polyelectrolytes have been employed in carrying out a process according to this invention it will be appreciated that other non-ionic and cationic polyacrylamide based polyelectrolyte flocculants may be employed.

BRIEF DESCRIPTION OF THE DRAWING

The method of this invention may be more completely understood by having reference to the accompanying drawing which is a flow sheet outlining a preferred embodiment of the method according to this invention.

DESCRIPTION OF THE PREFERRED EMBODIMENTS

The conventional scouring train consists of three or four hot scour bowls 10 and two or three cold rinse bowls 13 through which wool is fed counter-current to the flow of scour liquid 11. Most of the grease, dirt and suint is removed in the first two scour bowls. It is the liquor from the first bowl which is treated in grease and dirt recovery processes. Grit and sand recovered from the wool settles readily to the bottom of the bowls and is removed from the scour system, for example, by use of an auger in what is described as "self-cleaning" bowl. A perforated metal grid allows wool to be raked through the liquor above the grid while solids are washed out through the bottom of the grid along discharge line 17. Effluent from scour trains with self-cleaning bowls passes through open settling pits in which coarse solids are resettled and the partially clarified effluent passes to waste.

The scoured wool after rinsing in the rinsing tanks 13 is passed to a dryer 14 and recovered at 15.

Spent scoured liquor from the first wool scour bowl is discharged along line 18. A polyelectrolyte flocculant as described in our U.S.S.N. 504,820 is injected at 19 and liquor passed to flotation tank 21. Air is injected into the flotation tank 21 at injection point 23 and flock discharged at the top of the tank and passed to sludge collection along line 22. This aspect of wool scour effluent treatment is more particularly described in our co-pending application 504,820.

In the method described herein scour liquid from the flotation tank 21 has been pre-treated to remove suspended solids as well as dirt. However, it is possible to treat spent scour liquor without the pre-treatment in the flotation tank to remove suspended solids. In the present case the pre-treated liquor is passed along line 24 into mixer 26. Preferably the pH in the mixer is adjusted to be in excess of 8 but it has been determined that a specific pH, provided it is sufficiently high, is not critical. The ionic level of the liquor is usually sufficient due to the presence of suint in the liquor. However, if the suint level is not sufficiently high as might be the case if liquor is taken from a plant having an initial cold wash, it may be necessary to add a simple electrolyte, such as common salt, to build up a sufficient ionic level.

After the liquor has been treated to optimize the grease recovery it is passed along line 29 into mixer 31. Here alcohol is added along line 32. When n-pentanol is used between about 3 and 4% alcohol is required to saturate the aqueous phase and create a separate alcohol phase. The amount of alcohol which needs to be employed can be readily determined by the solubility of the particular alcohol and the suint level in water.

After the alcohol and liquor phases have been mixed but before mixing is carried to such a degree that an emulsion is formed a non-ionic or a cationic polyelectrolyte flocculant as described above is added to the stream 33 before it enters flotation tank 36. Sufficient flocculant is added to provide a concentration of 2–20 ppm, preferably 5–10 ppm. To aid in the flotation process preferably there is injected an air stream at 37. There are formed three distinct phases: the heaviest phase is regenerated liquor from which all grease and dirt have been removed, a middle phase containing dirt, wool grease and water and an upper phase containing grease in alcohol. The tank is maintained at a constant temperature of about 60° C which is the normal temperature of a wool scour bowl. If the suint content is very low, the water temperature can be lowered at this point instead of raising the salt content.

The liquor phase in tank 36 is passed to waste or to further biological treatment if desired. The BOD level was generally reduced to about 4,000 and the grease content to 0.05 – 0.15% w.

The alcohol/grease upper phase and the water/dirt/grease middle phase are skimmed off the top of flotation tank 36 and passed along line 38 to heating tank 40 where the temperature of the mixture is raised to 90° C to facilitate separation of these phases.

A dirt/water phase containing some alcohol in solution is then discharged out line 39 to a distilling column 48. Azeotropic mixtures 49 and 51 which are, respectively, water rich and alcohol rich are recovered at the top of the column. Dirt and water are drawn off from the bowl at the bottom. Steam is normally injected in line 52 into the column to bring about this distillation. To minimize loss of heat the liquid recovered at the bottom of the column is normally passed through heat exchangers for supplying heat requirements in other portions of the process.

The uppermost grease/alcohol phase is drawn off along line 45 into stripping column 42. Steam is passed along line 46 to separate the "cream" containing 60 to 80% grease which is drawn from the bowl at the bottom of the column 42 from the water alcohol azeotropes 43 and 44 which are drawn off the top of the column. An anti-foaming agent is also generally added to the mixture here. The alcohol rich azeotropes from columns 42 and 48 may be re-used in mixer 31 to recover further amounts of grease. It has been found that recovery of alcohol is very high thus minimizing the operating costs for the method.

The amount of steam to be injected into columns 42 along line 46 is directly proportional to the amount of alcohol added in mixer 31. It will be appreciated that the lower the solubility of the alcohol in water the more economical will be the process. In Table II set out herein below there is made a comparison of various alcohols which we have tested.

Various samples of grease produced by treatment of liquor at pH 8 with pentanol and flocculant were analysed according to the standards set up by the British Pharmacopoeia 1968. The acid values were high at 7.4 and 3.8 respectively although this could be reduced to less than 1.0 by treating the liquor at pH 10.

On average about 80% of wool grease present in spent scour liquor was separated. About 90% of the separated wool grease was recovered.

The wool grease recovered was comparable with commercially recovered lanolin. With ever increasing prices of petroleum based products this wool grease recovery process is economically most attractive.

What we claim is:

1. In a method of treating spent wool scour liquor containing wool grease comprising settling out solid dirt particles and flocculating out suspended particles by adding a polyelectrolyte flocculant in a floatation tank, the improvement which comprises:
   a. adjusting the pH of said liquor to at least 8,
   b. adding an aliphatic or cyclic alcohol having between four and eight carbon atoms in a quantity greater than that required to saturate said liquor and adding sufficient additional cationic or nonionic organic polyelectrolyte flocculant to produce a concentration of 2–20 ppm weight/weight in said liquor,
   c. mixing said alcohol, flocculant and liquor at a temperature at least as high as ambient until substantially all of said wool grease is taken up by said alcohol,
   d. discontinuing said mixing to allow distinct alcoholic and aqueous phases to be formed, and
   e. separating said alcoholic phase from said aqueous phase and recovering wool grease from said alcoholic phase.

2. The method according to claim 1 wherein said alcohol is selected from the group consisting of n-pentanol, cyclohexanol and methylcyclohexanol.

3. The method according to claim 2 wherein said flocculant is a cationic or nonionic homopolymer or co-polymer of acrylamide with a molecular weight in excess of 1 million.

4. The method according to claim 3 wherein said flocculant is a homopolymer of acrylamide with a polymerization degree of 200,000.

5. The method according to claim 3 wherein said flocculant is a copolymer of:

TABLE II

COMPARISON OF ALCOHOLS

Treatment with 5 ppm
"Magnafloc 455" at 60° C

| Raw Liquor: | Total Solids | = | 3.72% w/v |
| --- | --- | --- | --- |
| | Grease | = | 0.76% w/v |
| | Dirt | = | 0.49% w/v |
| | Suint | = | 2.47% w/v |

| Alcohol | Vol. Added (% v/v) | Grease Conc. Red$^n$(%) | Dirt Conc. Red$^n$(%) |
| --- | --- | --- | --- |
| n-butanol | 10 | 92.5 | 64.5 |
| iso-butanol | 10 | 93.8 | 79.5 |
| sec-butanol | 10 | 47.4 | 52.2 |
| amyl (mixed) | 4 | 83.6 | 64.5 |
| n-pentanol | 4 | 90.7 | 63.7 |
| iso-pentanol | 4 | 87.7 | 67.8 |
| sec-pentanol | 4 | 62.9 | 65.8 |
| cyclohexanol | 3 | 80.0 | 72.7 |
| methyl-cyclohexanol | 4 | 88.9 | 83.1 |

$(CH_2CHCONH_2 + CH_2CHCOONa)_n$

Where $CH_2CHCOONa$ is present in a proportion of about 10% by weight and n is about 200,000.

6. The method according to claim 1 wherein the concentration of said flocculant in said liquor is between 5 and 10 parts per million.

7. The method according to claim 1 wherein air is injected into said alcohol, flocculant and liquor during said mixing step (c).

8. The method according to claim 1 wherein the temperature of said liquor is at least 60° C during said mixing step (c).

9. The method according to claim 8 wherein the temperature of said alcoholic and aqueous phases is raised to no more than 90° C whereby separation of phases is facilitated.

10. The method according to claim 1 wherein said wool grease is recovered from said alcoholic phase by distillation and the alcohol distillate is recycled to said step (b).

* * * * *